United States Patent
Arabi et al.

(10) Patent No.: US 12,286,553 B2
(45) Date of Patent: Apr. 29, 2025

(54) METHOD FOR REJUVENATING A ROOF AND ROOF COATING COMPOSITION

(71) Applicant: Spray-Net Franchises Inc., Boucherville (CA)

(72) Inventors: Peiman Arabi, Boucherville (CA); Carmelo Marsala, Boucherville (CA)

(73) Assignee: Spray-Net Franchises Inc., Boucherville (CA)

( * ) Notice: Subject to any disclaimer, the term of this patent is extended or adjusted under 35 U.S.C. 154(b) by 730 days.

(21) Appl. No.: 16/680,889

(22) Filed: Nov. 12, 2019

(65) Prior Publication Data
US 2020/0148912 A1 May 14, 2020

Related U.S. Application Data

(60) Provisional application No. 62/758,023, filed on Nov. 9, 2018.

(51) Int. Cl.
| | | |
|---|---|---|
| *C09D 175/06* | (2006.01) | |
| *C08K 3/013* | (2018.01) | |
| *C08K 3/015* | (2018.01) | |
| *C08K 3/36* | (2006.01) | |
| *C08K 5/00* | (2006.01) | |
| *C08K 5/05* | (2006.01) | |
| *C08L 83/04* | (2006.01) | |
| *C09D 5/02* | (2006.01) | |

(52) U.S. Cl.
CPC .......... *C09D 175/06* (2013.01); *C08K 3/013* (2018.01); *C08K 3/015* (2018.01); *C08K 3/36* (2013.01); *C08K 5/005* (2013.01); *C08K 5/05* (2013.01); *C08L 83/04* (2013.01); *C09D 5/022* (2013.01)

(58) Field of Classification Search
CPC .......... B29C 73/02; C09D 195/00–005; C09D 7/66–70; C09D 7/80; E04D 7/00–005
See application file for complete search history.

(56) References Cited

U.S. PATENT DOCUMENTS

| | | | | |
|---|---|---|---|---|
| 4,413,026 A | * | 11/1983 | Sherno | C09D 5/028 427/407.1 |
| 4,666,960 A | * | 5/1987 | Spain | C09K 21/14 523/179 |
| 4,745,032 A | * | 5/1988 | Morrison | B05D 7/52 428/307.3 |
| 2015/0175806 A1 | * | 6/2015 | Gerard | D21H 15/02 106/464 |
| 2015/0361301 A1 | * | 12/2015 | Egan | C09D 133/26 525/190 |
| 2017/0037263 A1 | * | 2/2017 | Iyer | C09D 125/04 |

FOREIGN PATENT DOCUMENTS

WO  WO-9502098 A1 * 1/1995  ............... B05D 1/02

OTHER PUBLICATIONS

ECC-ES Report; ESR-2097. ICC Evaluation Service. 2015. (Year: 2015).*
Technical Guide Troubleshooting: Waterproofing, Flooring Roofing Cause, Repair, Prevention. Neogard Technical Service. Nov. 2014. (Year: 2014).*

* cited by examiner

*Primary Examiner* — Stephen E Rieth
(74) *Attorney, Agent, or Firm* — Leason Ellis LLP

(57) ABSTRACT

A method for rejuvenating a roof or a facade of a building and a coating composition are disclosed. The method comprises: providing a pre-mix base composition comprising a water based polymeric emulsion or resin and a rheology modifier added to the pre-mix composition to adjust a viscosity of the pre-mix base composition between about 100 KU and about 140 KU according to ASTM D562; mixing the pre-mix base composition with solid granules to form a coating composition with a ratio pre-mix base composition/solid granules in the coating composition ranging from 1/1 to 1/2; and applying the coating composition on the roof or façade. The coating composition once applied on the surface and dried preserves original shingles' aesthetics and flexibility without cracking while rejuvenating the shingles. The method allows creating a much stronger bond to the surface than original granules.

11 Claims, 4 Drawing Sheets

```
                                    1000

┌─────────────────────────────────────────────────────────────────┐
│ Providing a pre-mix base composition comprising: a water based  │
│ polymeric emulsion or resin adapted for providing the coating   │
│ composition with a strong adhesion to the roof or façade; and a given │
│ amount of a rheology modifier agent added to the pre-mix composition to │
│ adjust a viscosity of the pre-mix base composition between about 100 KU │
│ and about 140 KU, preferably between about 125 and about 135 KU, │
│ according to ASTM D562.                                         │
└─────────────────────────────────────────────────────────────────┘
                                    │
                                    ▼                    1010

┌─────────────────────────────────────────────────────────────────┐
│ Mixing the pre-mix base composition with an amount of solid granules to │
│ form a coating composition, wherein the mixing is done on site according │
│    to a ratio pre-mix base composition / solid granules in the coating │
│   composition ranging from 1 / 1 to 1 / 2, preferably from about 1 / 1.1 to │
│                            about 1 / 1.5.                       │
└─────────────────────────────────────────────────────────────────┘
                                    │
                                    ▼                    1020

┌─────────────────────────────────────────────────────────────────┐
│          Applying the coating composition on the roof or façade │
└─────────────────────────────────────────────────────────────────┘
                                                         1030
```

Spraying the coating composition on the asphalt shingles to entirely cover the roof or façade — 1032

Letting the coating composition to dry or cure;

wherein a resulting coating layer is formed on the asphalt shingles with a granule density of from about 100 g/sq.ft. to about 200 g/sq.ft, preferably from about 130 g/sq.ft. to about 170 g/sq.ft — 1034

FIGURE 4

METHOD FOR REJUVENATING A ROOF AND ROOF COATING COMPOSITION

CROSS-REFERENCE TO RELATED APPLICATIONS

The present patent application claims the benefits of priority of U.S. Provisional Patent Application No. 62/758,023, entitled "ROOF COATING COMPOSITION AND METHOD OF MAKING THE SAME", and filed at the United States Patent and Trademark Office on Nov. 9, 2018, the content of which is incorporated herein by reference.

FIELD OF THE INVENTION

The present invention generally relates to a roof coating composition and a method of making the same, particularly useful for reroofing and/or rejuvenating asphalt shingles.

BACKGROUND OF THE INVENTION

Roof shingles are a roof covering consisting of individual overlapping elements which are typically flat, rectangular shapes laid in courses from the bottom edge of the roof up, with each successive course overlapping the joints below. Shingles can be made of various materials such as wood, slate, flagstone, metal, plastic, and composite materials such as fibre cement and asphalt shingles. Ceramic roof tiles, which still dominate in Europe and some parts of Asia, are still usually called tiles. Roof shingles may deteriorate faster and need to repel more water than wall shingles. They are a very common roofing material in Canada and the United States.

Roof shingles are almost always highly visible and so are an important aspect of a building's aesthetics in patterns, textures and colors. In the United States of America and Canada, fiberglass-based asphalt shingles are by far the most common roofing material used for residential roofing applications. In Europe, they are called bitumen roof shingles or tile strips, and are much less common. They are easy to install, relatively affordable, last 20 to 60 years and are recyclable in some areas. Asphalt shingles come in a large number of styles and colors. The protective nature of paper and fiberglass asphalt shingles primarily comes from the long-chain petroleum hydrocarbons, while wood shingles are protected by natural oils in the cellulose structure. Over time in the hot sun, these oils soften and when rain falls the oils are gradually washed out of the shingles. During rain, more water is channeled along eaves and complex rooflines, and these are subsequently more prone to erosion than other areas. Eventually the loss of the oils causes asphalt shingle fibers to shrink and wood shingles to rot, exposing the nail heads under the shingles. Once the nail heads are exposed, water running down the roof can seep into the building around the nail shank, resulting in rotting of underlying roof building materials and causing moisture damage to ceilings and paint inside.

Residential reroofing by replacing all the shingles can be very expensive. Alternatively, the shingles can be coated to extend their life. However, such coating must preserve building's aesthetics while providing a complete rejuvenation of the shingles.

SUMMARY OF THE INVENTION

The shortcomings of the prior art are generally mitigated by a new method for rejuvenating a roof or a façade of a building and a new coating formulation to be applied to asphalt shingles providing weather resistance and protection while preserving building's aesthetics, such as color and texture.

According to a first aspect of the invention, it is disclosed a method for rejuvenating a roof or a facade of a building. The method comprises:

providing a pre-mix base composition comprising:
  a water based polymeric emulsion or resin adapted for providing the coating composition with a strong adhesion to the roof or façade; and a given amount of a rheology modifier agent added to the pre-mix composition to adjust a viscosity of the pre-mix base composition between about 100 KU and about 140 KU, preferably between about 125 and about 135 KU, according to ASTM D562;

mixing the pre-mix base composition with an amount of solid granules to form a coating composition, wherein the mixing is done on site according to a ratio pre-mix base composition/solid granules in the coating composition ranging from 1/1 to 1/2, preferably ranging from about 1/1.1 to about 1/1.5; and applying the coating composition on the roof or façade.

According to a preferred embodiment, the roof or facade of the building has a surface comprising asphalt shingles, applying the coating composition on the roof or façade comprises spraying the coating composition on the asphalt shingles to entirely cover the roof or façade, and letting the coating composition to dry or cure; wherein a resulting coating layer is formed on the asphalt shingles with a granule density of from about 100 g/sq.ft. to about 200 g/sq.ft, preferably from about 130 g/sq.ft. to about 170 g/sq.ft.

According to a preferred embodiment, the pre-mix base composition comprises from about 40 wt. % to about 95 wt. % of the water based polymeric emulsion or resin, and from 0.1 to 1.0 wt. % of the rheology modifier agent. Preferably, the rheology modifier agent comprises a hydrophobically modified ethylene oxide urethane (HEUR), a solution of a urea-modified polyurethane, or a mixture thereof.

According to a preferred embodiment, the pre-mix base composition further comprises at least one solvent comprising water, 2,2,4-trimethyl-1,3-pentaandiolmono-isobutyrate, ethylene glycol monobutyl ether or a mixture thereof, said at least one solvent forming a coalescent agent with the rheology modifier agent.

According to a preferred embodiment, the pre-mix base composition further comprises from about 2 to about 40 wt. % of a mattifying agent. Preferably, the mattifying agent comprises from about 15 wt. % to about 25 wt. % of sodium-potassium alumina silicate, from about 0 wt. % to 15 wt. % of amorphous aluminum silicate or a mixture thereof.

According to a preferred embodiment, the pre-mix base composition further comprises a given amount of at least one pigment in order to tune the color of the pre-mix composition and therefore the color of the coating composition and resulting roof coating, the method further comprising grinding the matiffying agent and the at least one pigment together to form particles before adding said particles to the pre-mix base composition. Preferably, the matiffying agent and the at least one pigment are ground with a high shear for up to 20 minutes to break down the particles until to obtain a mean size of said particles to about 6 H.

According to a preferred embodiment, the pre-mix base composition further comprises at least one additive selected form the group consisting of a defoamer agent, a surfactant, a fungicide agent, an algaecide agent, a light stabilizer, an antifreeze agent, a colorant, a pigment, a light stabilizer, a UV absorber, and a mixture thereof.

According to a second aspect of the invention, it is disclosed a coating composition for rejuvenating a roof or a façade of a building, the coating composition comprising a pre-mix composition to be mixed on site with a given amount of solid granules to form said coating composition. The pre-mix base composition comprises a water based polymeric emulsion or resin adapted for providing the coating composition with a strong adhesion to the roof or façade, and a given amount of a rheology modifier agent added to the pre-mix composition to adjust a viscosity of the pre-mix base composition between about 100 KU and about 140 KU, preferably between about 125 and about 135 KU, according to ASTM D562; and wherein the mixing of the pre-mix base composition with the given amount of solid granules is done according to a ratio pre-mix base composition/solid granules in the coating composition ranging from 1/1 to 1/2, preferably form 1.1/1 to 1/1.5.

Although the coating composition comprises solid elements such as ceramic granules, the composition can be sprayed on a surface, such as on asphalt shingles. The composition, once applied on the surface and dried, preserves original shingles' aesthetics and flexibility while rejuvenating the shingles.

The main reason why roofs deteriorate is granule loss because the asphalt is then exposed to the UV rays, dries it out and curls or cracks. The present invention allows creating a much stronger bond of the solid granules to the surface than original granules that are simply stamped into the asphalt during the manufacturing process. The present invention allows increasing the durability and extend the life of asphalt shingles.

Other and further aspects and advantages of the present invention will be better understood upon the reading of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 3 is a flowchart for illustrating a method for rejuvenating a roof or a facade of a building according to a preferred embodiment; and FIG. 4 is a flowchart for illustrating a more preferred embodiment of the method illustrated on FIG. 3.

DETAILED DESCRIPTION OF THE PREFERRED EMBODIMENT

Figure 1:
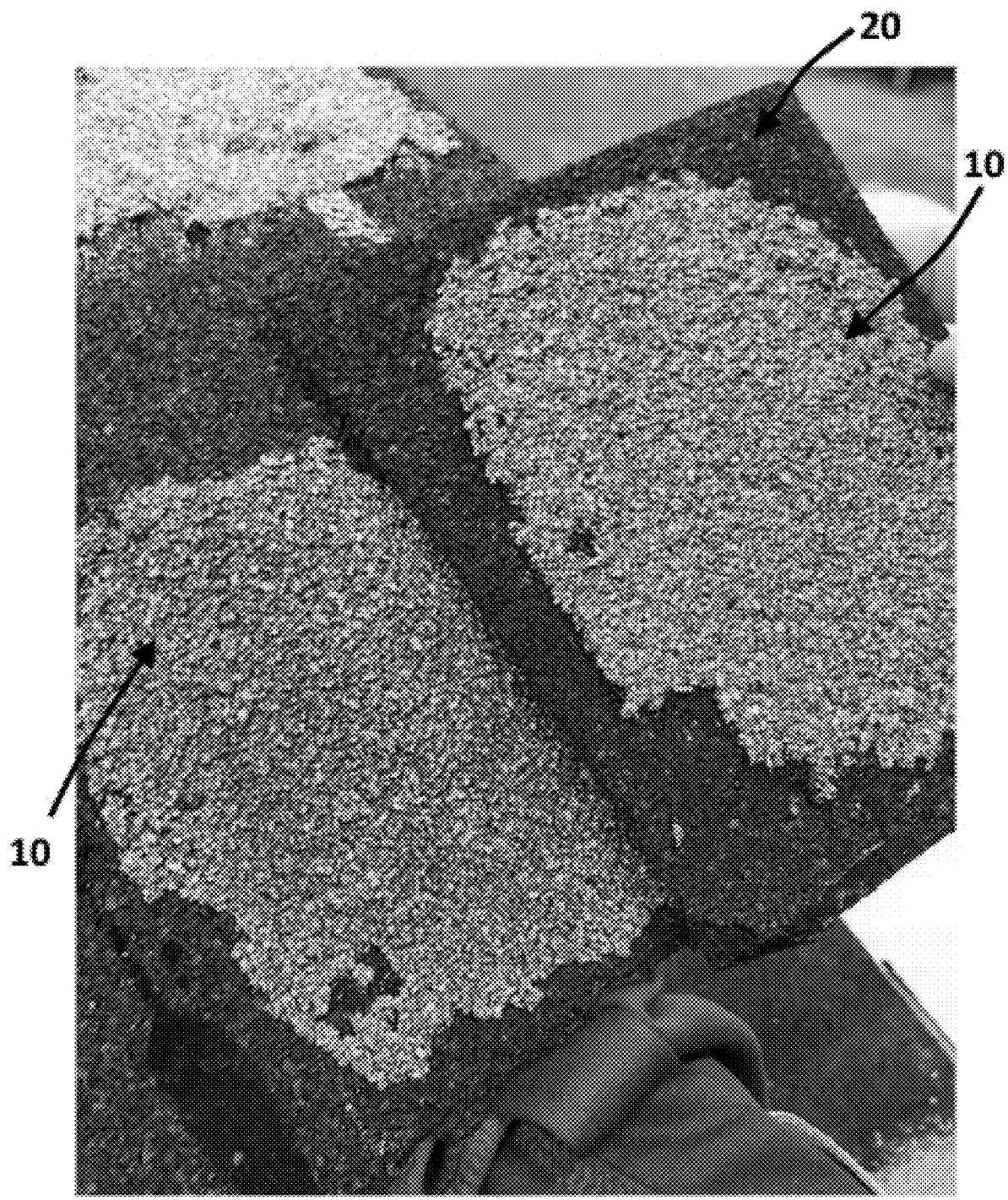
FIG. 1 is a picture showing the coating composition sprayed on shingles according to a preferred embodiment.

A novel roof coating method and composition for rejuvenating a roof or a façade of a building will be described hereinafter. Although the invention is described in terms of specific illustrative embodiments, it is to be understood that the embodiments described herein are by way of example only and that the scope of the invention is not intended to be limited thereby.

The terminology used herein is in accordance with definitions set out below.

As used herein % or wt. % means weight % unless otherwise indicated. When used herein % refers to weight % as compared to the total weight percent of the phase or composition that is being discussed.

By "about", it is meant that the value of weight % (wt. %), time, pH, volume or temperature can vary within a certain range depending on the margin of error of the method or device used to evaluate such weight %, time, pH, volume or temperature. A margin of error of 10% is generally accepted.

The description which follows, and the embodiments described therein are provided by way of illustration of an example of particular embodiments of principles and aspects of the present invention. These examples are provided for the purposes of explanation and not of limitation, of those principles of the invention. In the description that follows, like parts and/or steps are marked throughout the specification and the drawing with the same respective reference numerals.

As illustrated in FIG. 3, a method for rejuvenating a roof or a facade of a building is provided (1000). The method comprises:

Providing (1010) a pre-mix base composition comprising:
   a water based polymeric emulsion or resin adapted for providing the coating composition with a strong adhesion to the roof or façade; and a given amount of a rheology modifier agent added to the pre-mix composition to adjust a viscosity of the pre-mix base composition between about 100 KU and about 140 KU, preferably between about 125 and about 135 KU, according to ASTM D562;

mixing the pre-mix base composition with an amount of solid granules to form a coating composition (1020), wherein the mixing is done on site according to a ratio pre-mix base composition/solid granules in the coating composition ranging from 1/1 to 1/2, preferably ranging from about 1/1.1 to about 1/1.5; and applying the coating composition on the roof or façade (1030).

According to a preferred embodiment, the roof or facade of the building has a surface comprising asphalt shingles, as illustrated on FIG. 1 showing the roof coating composition 10 as disclosed herein adapted to be sprayed on the shingles 20.

As illustrated in FIG. 4, applying the coating composition on the roof or façade (1030) preferably comprises spraying the coating composition on the asphalt shingles to entirely cover the roof or façade (1032), and letting the coating composition to dry or cure (1034). The resulting coating layer formed on the asphalt shingles has preferably a granule density of from about 100 g/sq.ft. to about 200 g/sq.ft, preferably from about 130 g/sq.ft. to about 170 g/sq.ft.

The coating composition comprises a pre-mix base composition, also named herein the "clear base" (CB), which is generally mixed on site (i.e. where the roof to be rejuvenated is located) with an amount of roofing solid granules (CR) before being sprayed on the roof surface using a spraying gun. The roofing solid granules may comprise ceramic granules, amorphous aluminum silicate, or the like, or mixture thereof. The ratio clear base composition (CB)/roofing solid granules (CR) is about 1/1 to 1/2, preferably from 1/1.1 to 1/1.5, more preferably 2/3 (or 1/1.5).

The base composition once mixed with roofing ceramic granules may provide a coating texture comparable to the texture of the original shingles to be coated.

The base composition comprises as a main component a water based polymeric emulsion or resin adapted for providing strong adhesion to most architectural roofs or facades. Preferably, the emulsion is an acrylic polyurethane hybrid emulsion, such as Carboset® by Lubrizol or RHOPLEX™ by Dow.

A mattifying agent and filler are added to the base composition to mattify the resulting coating which is otherwise too shiny (gloss). Examples of mattifying agent comprises treated silica, amorphous aluminum silicate, sodium-potassium alumina silicate, or the like or mixtures thereof.

The composition may further comprises a thickener or rheology modifier to adjust the viscosity of the coating composition and allow the coating composition containing the granules to be sprayed on a surface with a spraying gun. The viscosity is measured according to ASTM D562: Standard Test Method for Consistency of Paints Measuring Krebs Unit (KU) Viscosity Using a Stormer-Type Viscometer. A viscosity of the coating composition of about 100-140 KU, preferably about 125-135 KU, is particularly adapted for spraying application. For example, hydrophobically modified ethylene oxide urethane (also known as hydrophobicaly modified urethane-ethoxylate or HEUR) or a solution of a urea-modified polyurethane can be used. The invention is not limited to the nature of the viscosity modifier.

The composition may further comprises a defoamer agent, such as a silicone-containing defoamer. For example, the defoamer agent can be an emulsion of polyether-modified polydimethylsiloxane with hydrophobic solids.

The composition may further comprise at least one solvent such as, but not limited to water ($H_2O$), Texanol™ (2,2,4-Trimethyl-1,3-pentanediol monoisobutyrate), Ethylene glycol monobutyl ether, or a mixture thereof. The solvents and the rheology modifier agent form a coalescing agent.

The composition may further comprise at least one biocide such as fungicide, algicide (or algaecide), or the like. The invention is not limited to the nature of the biocide agent.

The composition may further comprise at least one antifreeze agent, such as, but not limited to ethylene glycol (ethane-1,2-diol). The invention is not limited to the nature of the antifreeze agent.

The composition may further comprise at least one light stabilizer, such as but not limited to hindered-amine light stabilizers (HALS). The invention is not limited to the nature of the light stabilizer.

The composition may further comprise at least one UV absorber, such as, but not limited to 2-hydroxy-phenyl-s-triazine (HPT), Timuvin® (2-[4-[(2-Hydroxy-3-dodecyloxypropyl)oxy]-2-hydroxyphenyl]-4,6-bis(2,4-dimethylphenyl)-1,3,5-triazine and 2-[4-[(2-Hydroxy-3-tridecyloxypropyl)oxy]-2-hydroxyphenyl]-4,6-bis(2,4-dimethylphenyl)-1,3,5-triazine (1-methoxy-2-propanol 15%)), or mixture thereof. The invention is not limited to the nature of the UV absorber.

Examples

TABLE 1

Pre-mix clear base compositions:

| Formulations (F) | Example | F#1 (wt. %) | F #2 (wt. %) | F #3 (wt. %) | F #4 (wt. %) |
|---|---|---|---|---|---|
| Water based polymeric emulsion or resin | Acrylic polyurethane hybrid emulsion | 92.79 | 91.10 | 90.76 | 20-60 |
| Mattifying component | Treated silica | 2.00 | 3.00 | 3.00 | 0.5-3 |
|  | Sodium-potassium alumina silicate | 0 | 0 | 0 | 25-55 |
| Defoamer agent | Polyether-modified polydimethyl siloxane | 0.36 | 0.36 | 0.36 | 0.01-0.5 |
| Solvents | $H_2O$ | 2.25 | 2.25 | 2.25 | 5-20 |
|  | 2,2,4-trimethyl-1,3-pentaandiolmonoisobutyrate | 0.89 | 0.89 | 0.89 | 0.1-4 |
| Fungicide/Algicide | Dichloro-octylisothiazolinone | 0.53 | 0.53 | 0.53 | 0.1-3 |
| Antifreeze agent | Ethylene Glycol | 0.50 | 0.50 | 0.50 | 0.5-3 |
| Light stabilizers and UV absorber | HALS | 0.50 | 0.75 | 0.75 | 0.1-2 |
| Rheology modifier | HEUR | 0.18 | 0.62 | 0.96 | 0.1-1.0 |
| Pigment | Black pigment | 0 | 0 | 0 | 0.05-5 |
| Surfactant | Nonionic surfactant | 0 | 0 | 0 | 1-5 |
| Acid neutralizer | 2-amino-2-methyl-1-propanol | 0 | 0 | 0 | 0.1-1.0 |

TABLE 2

Coating compositions and physical properties

| Base clear Composition (BC) | F #1 | F #2 | F #3 | F #4 | Acceptable range |
|---|---|---|---|---|---|
| BC/CR (granules) ratio | 1/1.5 | 1/1.5 | 1/1.5 | 1/1.1 | 1/1-1/2 |
| Viscosity (KU) | 100 | 110 | 130 | 130 | 100-140 |
| pH | 9 | 8.75 | 8.80 | 8.9 | 8-9.5 |
| Solid or non-volatile (%) | 54 | 54.5 | 54.4 | 59 | 60 ± 5 |
| Dry time (hours) | 2 | 2 | 2 | 2 | 1-4 |
| Full Cure (days) | 7 | 7 | 7 | 7 | 7-10 |
| Gloss (%) | 5 | 2 | 2 | 0.3 | Max 2% |

Table 2 shows compositions after mixing the pre-mix composition and the solid granules on site.

Pre-mix compositions provided in Table 1 allow forming coating compositions that flow enough to be sprayed and providing with a gloss finish fitting with the original gloss of the shingles.

The addition of fillers may imply the use of pigments rather than colorants, and a pre-stage for the making of the pre-mix composition by grinding the fillers and pigments together. Pigments instead of colorant are added to the base clear composition to tune the final color of the coating and match with the original surface color or with the desired color.

With formula F #4, some silica are added to tune the shine because there is no more room to add filler or Amorphous Aluminum silicate without changing the final color. Also, due to the using pigments in formulation, discoloration may occur. Therefore, UV absorber additive are added in formula F #4 to prevent fading. After finalising the formula, the ratio of pre-mix composition and granules has been tuned to find an adequate coating combination. The results regarding formula F #4 combined with the granules are reported in Table 2, with an optimum ratio of 1 part of pre-mix composition to 1.1 part of granules.

In addition to the formulae ingredients developed by the inventors, a new process for the making the pre-mix composition (also named the "clear base") has been developed.

According to a preferred embodiment, the process for making the pre-mix base composition may comprise:
a. mixing the acrylic polyurethane hybrid emulsion with mattifying agent to form a first mixture;
b. mixing the first mixture with the defoamer agent to form a second mixture;
c. mixing the second mixture with the solvents ($H_2O$ and Texanol) to form a third mixture;
d. adding the other components disclosed herein to the third mixture to form a fourth mixture; and
e. adjusting the viscosity of the fourth mixture by adding an adequate amount of viscosity modifier to the fourth mixture.

The clear base composition (BC) as made according to the above method is then mixed on site with the granules (CR), for instance according to the ratio BC/CR disclosed in Table 2, to form the coating composition right before to be sprayed on the roof surface.

According to the preferred embodiment of Formula F #4 of Table 2, polydimethysiloxane is preferably added to the water first before adding the hydroxyethylcellulose and mixing the mixture for 10 to 15 minutes. The other items or additives are then added up to the surfactant. Also, when pigments and sodium-potassium alumina silicate have to be added in the pre-mix composition, they are mixed it with a high shear for 15-20 min to break down the particle and reduce their size to about 6 H. Then, the other items are preferably added one by one. For the solvents, $H_2O$ and Texanol are mixed before being then added slowly to the polymer dispersion. Other items will be added by their order in the formula (Table 1).

The resulting coating layer on the roof may have a granule density of 100-200 g/sq.ft., preferably of about 130-170 g/sq.ft.

Although the coating composition comprises solid elements such as ceramic granules and silicate, the composition can be sprayed on a surface, such as on asphalt shingle surface. Although the composition has been particularly formulated to be applied on the roof using a spray gun, other known method for applying such a composition on the roof can be used.

Figure 2:
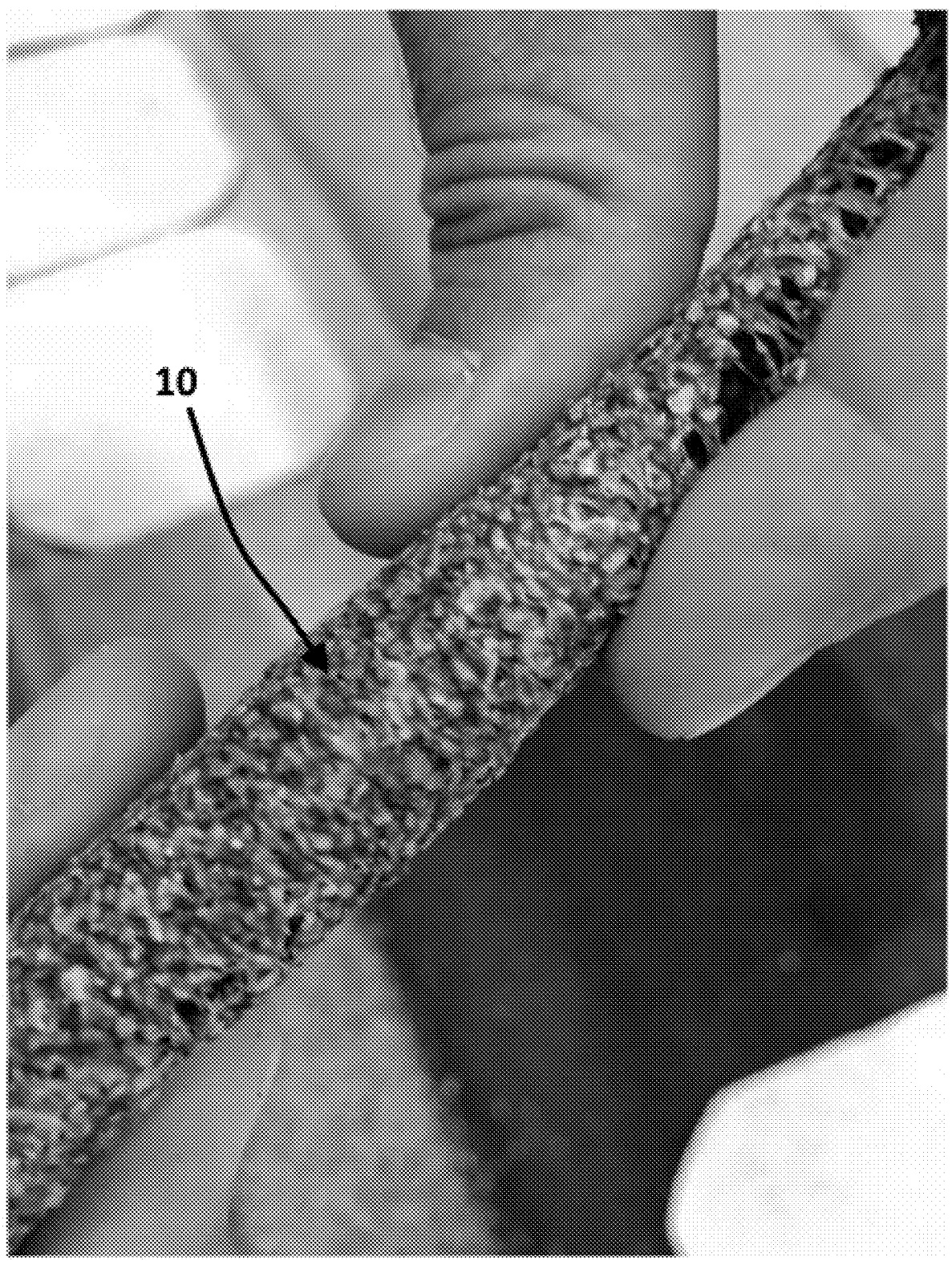
FIG. 2 is a picture of the composition shown in FIG. 1, the shingle being bent to show the elasticity of the coating composition once dried on the shingle.

The composition once applied on the surface and dried preserves original shingles' aesthetics and flexibility while rejuvenating the shingles. The flexibility of the coating (10) once dried on the original shingle (20) is illustrated by the picture of FIG. 2 showing the shingle in a bent position. The coating is perfectly flexible and follow the shingle's deformation without cracking.

As aforesaid, the present invention allows to easily tune the granular aspect, the gloss aspect, the viscosity and the final color of the coating in order to obtain a perfect match between the old roof to be coated and the final rejuvenated roof. In this regard, reference is made to Applicant's international patent application No. WO 2018/064742 (Marsala et al.), the content of which is incorporated herein by reference, describing a system and method for computing an adjustment procedure for obtaining an adjusted exterior waterborne paint composition. Such system and method could be used for adjusting the formulation of the roof coating composition disclosed herein.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

What is claimed is:

1. A method for rejuvenating a roof of a building, the method comprising:
   providing a pre-mix base composition comprising:
       a water based polymeric emulsion or resin adapted for providing adhesion to the roof; and
       a rheology modifier agent, wherein a viscosity of the pre-mix base composition is between about 100 KU and about 140 KU according to ASTM D562;
   mixing the pre-mix base composition with solid granules to form a coating composition, wherein the mixing is done on site;
   spraying the coating composition on the roof to cover the roof; and
   drying or curing the coating composition;
   wherein a resulting coating layer is formed on the roof with a remaining concentration of the solid granules of from about 100 g/sq.ft. to about 200 g/sq.ft;
wherein the roof has a surface comprising asphalt shingles, and spraying the coating composition on the roof to cover the roof comprises spraying the coating composition on the asphalt shingles to entirely cover the roof.

2. The method of claim 1, wherein the remaining concentration of the solid granules is between about 130 g/sq.ft and about 170 g/sq.ft.

3. The method of claim 1, wherein the viscosity of the pre-mix base composition is between about 125 and about 135 KU.

4. The method of claim 1, wherein the pre-mix base composition comprises from about 40 wt. % to about 95 wt. % of the water based polymeric emulsion or resin, and from 0.1 to 1.0 wt. % of the rheology modifier agent.

5. The method of claim 4, wherein the rheology modifier agent comprises a hydrophobically modified ethylene oxide urethane (HEUR), a solution of a urea-modified polyurethane, or a mixture thereof.

6. The method of claim 4, wherein the pre-mix base composition further comprises a coalescing agent comprising water and 2,2,4-trimethyl-1,3-pentanediol monoisobutyrate, ethylene glycol monobutyl either or a mixture thereof.

7. The method of claim 4, wherein the pre-mix base composition further comprises from about 2 to about 40 wt. % of a mattifying agent.

8. The method of claim 7, wherein the mattifying agent comprises treated silica, sodium-potassium alumina silicate, amorphous aluminum silicate or a mixture thereof.

9. The method of claim 1, wherein the pre-mix base composition further comprises at least one additive selected from the group consisting of a defoamer agent, a surfactant, a fungicide agent, an algaecide agent, a light stabilizer, an antifreeze agent, a colorant, a pigment, a light stabilizer, an ultraviolet (UV) ray absorber, and a mixture thereof.

10. A method for rejuvenating a roof of a building, the method comprising:
providing a pre-mix base composition comprising:
a water based polymeric emulsion or resin adapted for providing adhesion to the roof; and
a rheology modifier agent, wherein a viscosity of the pre-mix base composition is between about 100 KU and about 140 KU according to ASTM D562;
mixing the pre-mix base composition with solid granules to form a coating composition, wherein the mixing is done on site;
spraying the coating composition on the roof to cover the roof; and
drying or curing the coating composition;
wherein a resulting coating layer is formed on the roof with a remaining concentration of the solid granules of from about 100 g/sq.ft. to about 200 g/sq.ft;
wherein the pre-mix base composition comprises from about 40 wt. % to about 95 wt. % of the water based polymeric emulsion or resin, and from 0.1 to 1.0 wt. % of the rheology modifier agent;
wherein the pre-mix base composition further comprises from about 2 to about 40 wt. % of a mattifying agent;
wherein the mattifying agent comprises treated silica, sodium-potassium alumina silicate, amorphous aluminum silicate or a mixture thereof;
wherein the pre-mix base composition further comprises at least one pigment, the method further comprising grinding the mattifying agent and the at least one pigment together before adding said mattifying agent and at least one pigment to the pre-mix base composition.

11. The method of claim 1, wherein the mattifying agent and the at least one pigment are ground to a mean size of about 6 H.

* * * * *